Oct. 6, 1942.   F. H. JACOBS   2,297,892
AIR PRESSURE RELEASE FOR CLOSED AUTOMOBILES
Filed Jan. 28, 1941   2 Sheets-Sheet 1

Inventor
Frank H. Jacobs
By L. B. James
Attorney

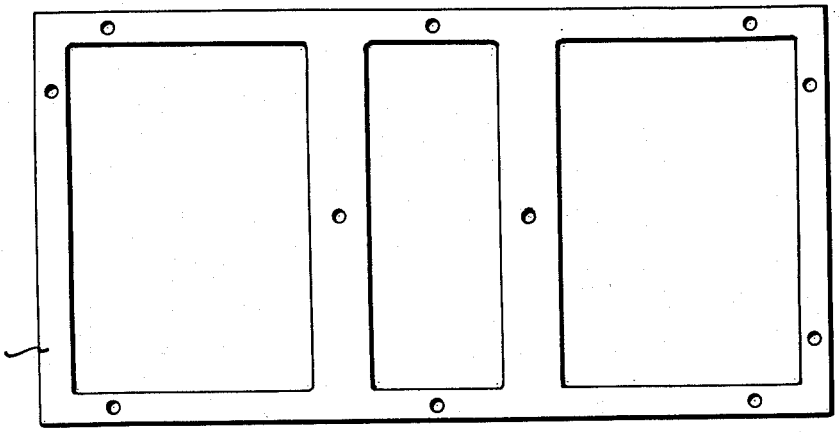
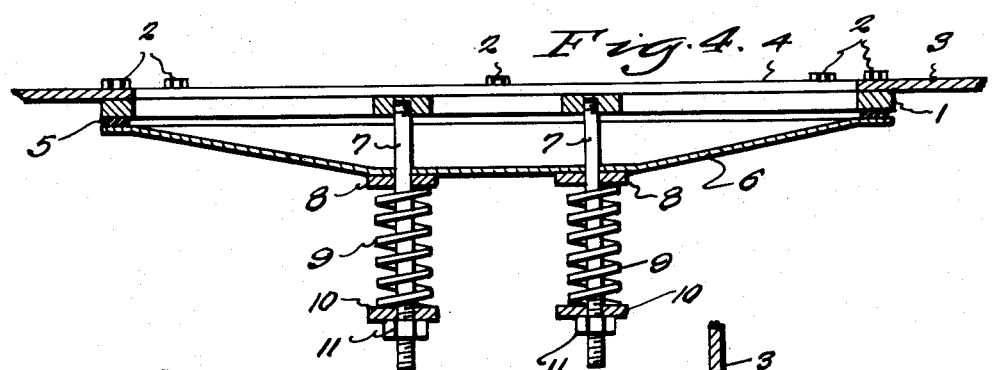
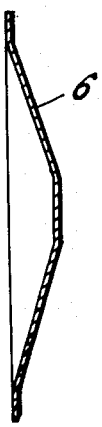
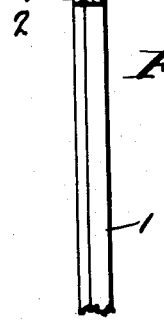

Patented Oct. 6, 1942

2,297,892

UNITED STATES PATENT OFFICE 2,297,892

AIR PRESSURE RELEASE FOR CLOSED AUTOMOBILES

Frank H. Jacobs, Puyallup, Wash.

Application January 28, 1941, Serial No. 376,375

1 Claim. (Cl. 251—145)

This invention relates to automatic valves for the bodies of automobiles, the general object of the invention being to provide a valve of this nature for relieving pressure in the body when a door is closed, the invention making it easier to close a door and eliminating danger of the door failing to latch properly unless the door is slammed.

The invention also consists in certain other features of construction, combination and arrangement of the several parts, to be hereinafter fully described, illustrated in the accompanying drawings and specifically pointed out in the appended claim.

In describing the invention in detail reference will be had to the accompanying drawings wherein like characters denote like or corresponding parts throughout the several views, and in which:

Figure 3 is a view of the frame of the device

Figure 4 is a section on line 4—4 of Figure 2

Figure 5 is a transverse sectional view through the movable member of the valve.

Figure 6 is a detail sectional view showing how the frame of the device is attached to the dash.

Figure 1:
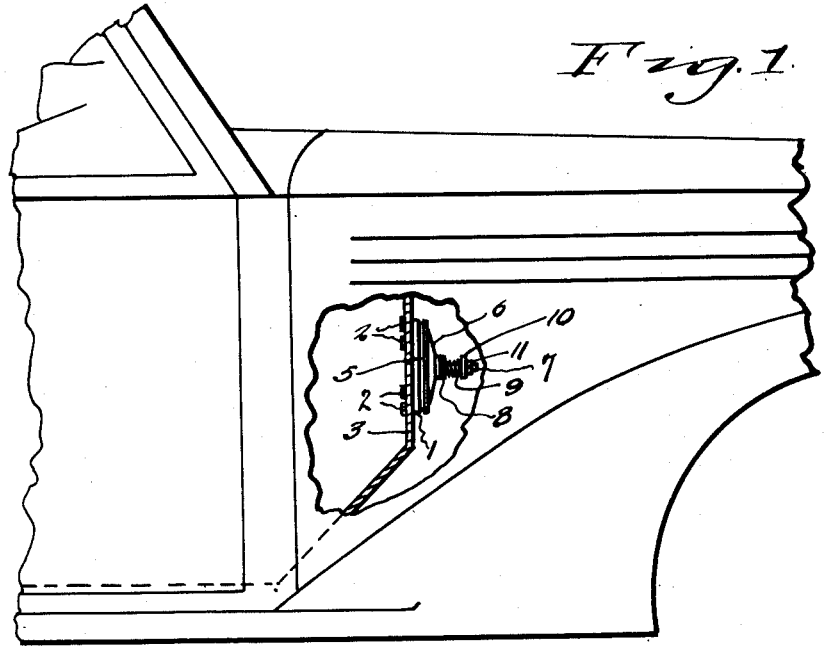
Figure 1 is a fragmentary side view of an automobile, with parts in section, showing the invention in use.
Figure 2:
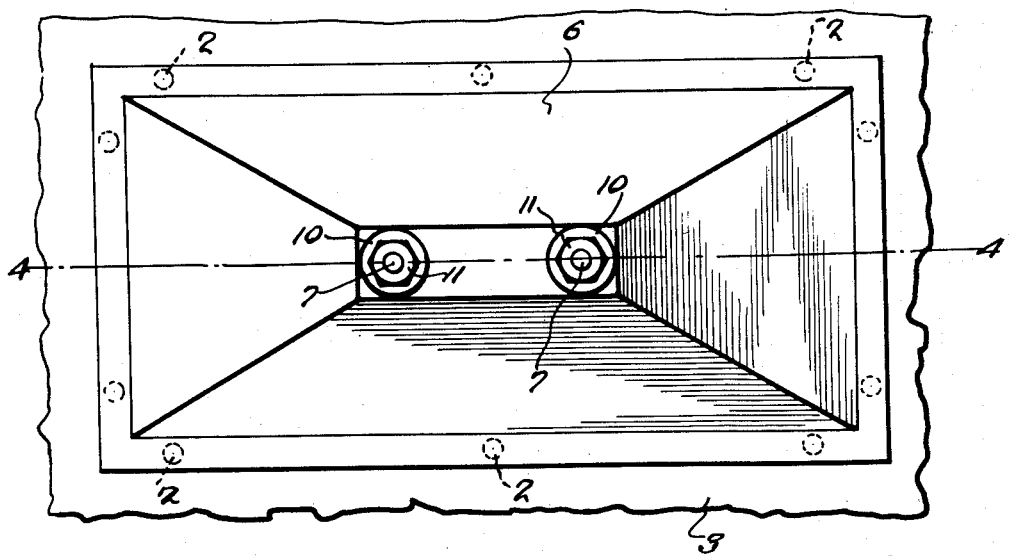
Figure 2 is a view looking towards the front of the device, with a part of the dash.

In these drawings, the numeral 1 indicates a frame of skeleton form which is fastened by the bolts 2 to the front face of the dash 3 of the automobile, said dash having an opening 4 therein, which is surrounded by the frame. A gasket 5 is attached to the front face of the frame adjacent the edges thereof. A substantially funnel shape cover or valve member 6 is adapted to cover the opening formed by the frame. This valve member is preferably of the shape shown to provide a small flat central portion with the rest of the member sloping rearwardly and outwardly from said flat part to the flat edges of the member. These flat edges engage the gasket. A pair of elongated guide bolts 7 extend forwardly from the cross pieces of the frame through holes formed in the flat central part of the valve member and through the bushings 8 which are fastened to the said flat part. An expansion spring 9 surrounds each guide bolt and bears against a bushing 8 and against a washer 10 adjustably held in place on a bolt by a nut 11.

Thus the valve member is normally held by the springs in closing position on the frame so that the opening 4 is closed. However, when a door of the vehicle is swung closed and air is compressed in the vehicle, said pressure will open the valve against the springs and thus the pressure will be reduced and the door can be closed easily and the latch will engage the keeper without necessitating the door being slammed.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

A valve comprising a substantially rectangular skeleton frame having spaced intermediate cross bars provided with threaded apertures at their medial points, elongated guide bolts threadedly secured in the aforesaid apertures, a substantially pyramid shape valve member having a flat apex provided with apertures adapted to slidably receive said bolts, said valve member having its edge portion lying in parallelism with the outer surface of the skeleton frame, a rectangular gasket secured to the outer surface of the skeleton frame in opposed relation to the edge portion of the valve member, apertured bushings disposed on the flat apex of the valve member and having apertures therein registering with those in said flat apex, washers on the free end portions of the bolts, nuts threaded on the free ends of the bolts and bearing against said washers and expansion coil springs surrounding the bolts with their opposite ends bearing against the bushings and washers.

FRANK H. JACOBS.